Feb. 23, 1926.

J. T. RYAN 1,574,171

WINDMILL

Filed April 2, 1924   2 Sheets-Sheet 2

Inventor
James T. Ryan
By Brown & Phelps
Attorneys

Patented Feb. 23, 1926.

1,574,171

UNITED STATES PATENT OFFICE.

JAMES T. RYAN, OF FRANKFORT, KENTUCKY.

WINDMILL.

Application filed April 2, 1924. Serial No. 703,691.

*To all whom it may concern:*

Be it known that I, JAMES T. RYAN, a citizen of the United States, residing at Frankfort, in the county of Franklin and State of Kentucky, have invented certain new and useful Improvements in Windmills, of which the following is a specification.

The invention relates to windmills, and has as an object the provision of a windmill having a rotor with flexible blades that will vary their curvature at various stages of rotation, so as to provide the most efficient curvature at each stage.

A further object of the invention is the provision of a rotor having flexible blades and means to adjust the amount of slack for the blades.

A further object of the invention is the provision of a rotor having a windshield and a deflector of an improved form adapted to coact with the particular form of blades of the rotor to the best advantage.

Further objects of the invention will appear from the following description when read in connection with the accompanying drawing, in which—

Figure 1:
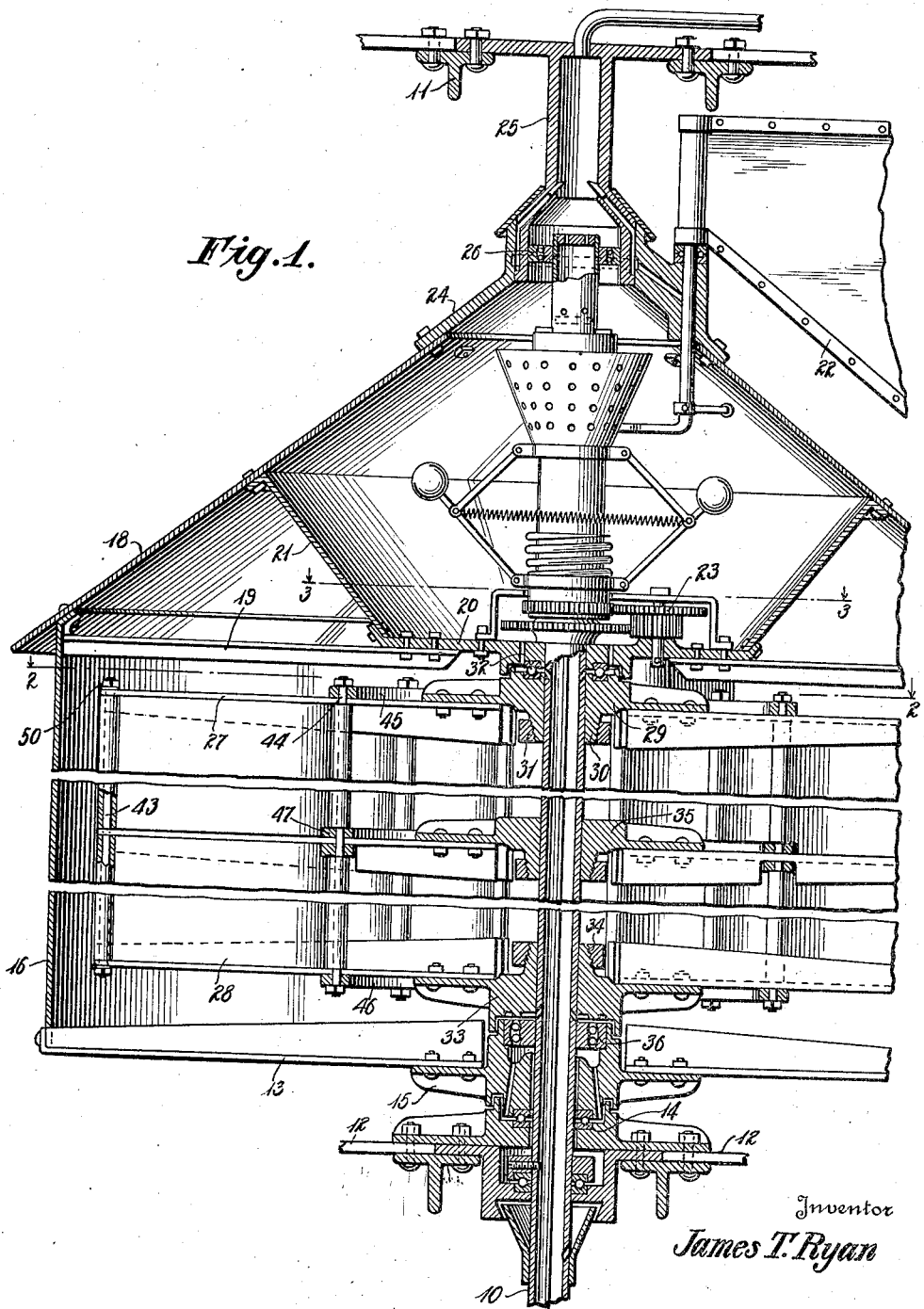
Fig. 1 is a detail vertical section broken away in order to shorten the view.

In Fig. 1, there is shown a vertical hollow shaft 10 which is supported in a frame having upper transverse members 11, in the manner shown in my Patent No. 1,523,295, granted Jan. 13, 1925, windmill, and also in my co-pending application 689,895, filed February 1, 1924, windmill lubricating system. The hollow shaft 10 is adapted to be revolved by the rotor and to drive any desired machinery in the manner illustrated in the co-pending applications referred to. Carried by the lower transverse frame members 12, there is shown a wind shield and deflector element supported by means of arms 13 upon a thrust bearing 14. The arms 13, which are provided in any desirable number, are shown as bolted or riveted to a hub member 15 containing one portion of the thrust bearing and the oil ducts provided by the last named co-pending application above referred to.

Figure 2:
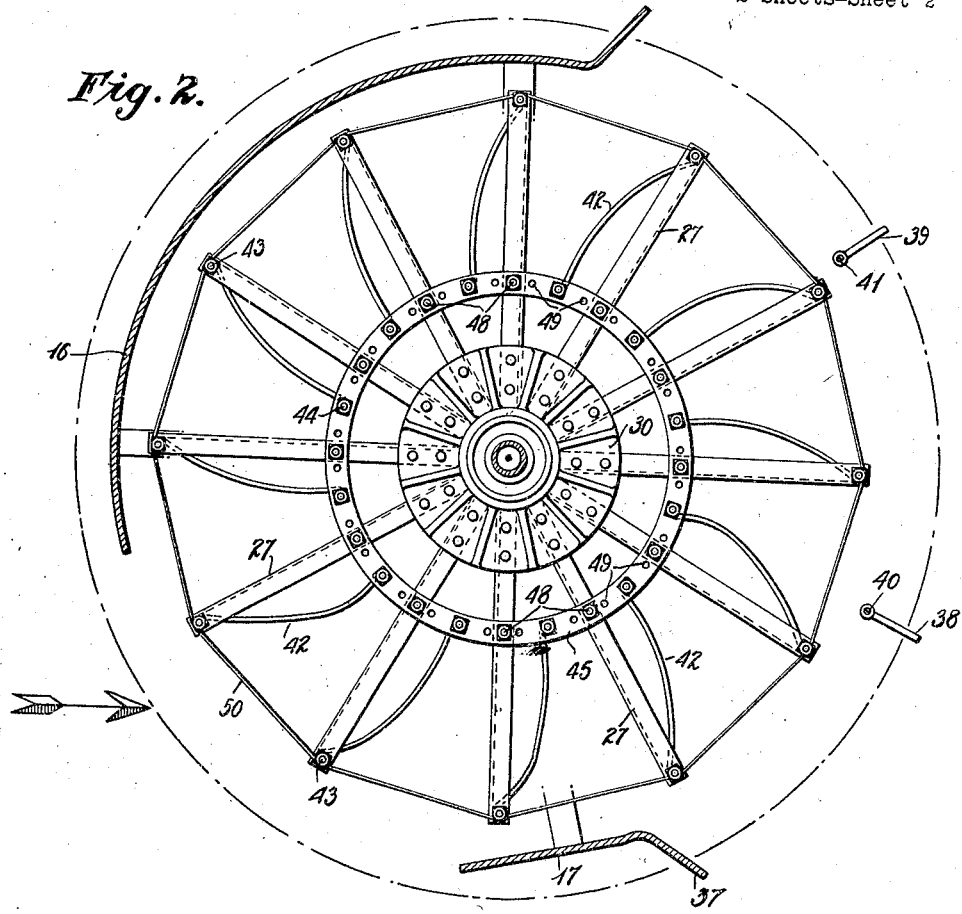
Fig. 2 is horizontal section on line 2, 2 of Fig. 1.
Figure 3:
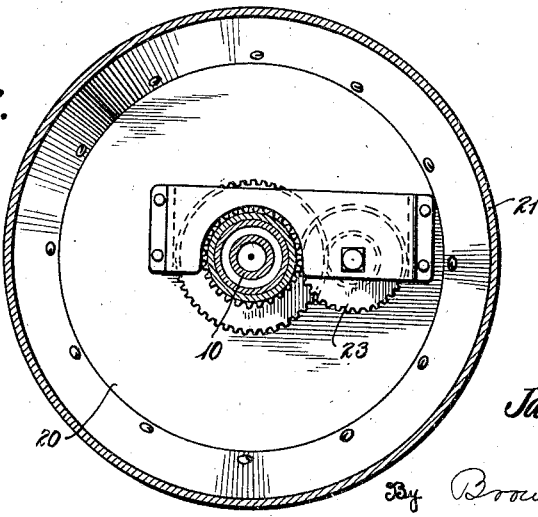
Fig. 3 is a detail horizontal section on line 3, 3, of Fig. 1.

The shield and deflector elements comprise an arcuate shield 16, Fig. 2, and a deflector element 17, which elements are shown as carried by the spider provided by the arms 13. The upper ends of the elements 16 and 17 are connected to and support a conical rain shield 18, and from the eaves of the rain shield and the upper end of the elements 16, 17, spider arms 19 are shown as projecting and as secured to a disk-like hub member 20.

An oil shield 21 is shown as enclosing governing elements adapted to control the movements of a vane 22, all as described in my co-pending applications above referred to, although in the present instance a single intermediate gearing 23 is shown instead of two such gears, as shown in the other applications. The shield 18 terminates in a conical member 24, preferably of cast material, which provides a bearing against the upper frame 25, a radial bearing 26 being supplied for the upper end of the shaft 10.

As shown, the frame of the rotor is formed of upper spider arms 27, and lower spider arms 28. The upper spider arms are shown as connected to a hub member 29 having a tapered threaded portion 30 which may be split and contracted against the shaft 10 by means of a tapered thread and nut 31. A bearing for the spider 19 is shown at 32 to avoid friction which might be caused by the relative rotation between the spiders 27 and 19. The arms 28 are shown as secured to a hub member 33 also secured to the shaft 10 by means of a tapered thread and nut 34. An intermediate spider and hub is shown at 35, but it is to be understood that this intermediate spider is representative of any number which it may be desired to use between the top and bottom of the rotor to break up the extent of each individual blade.

To reduce friction, due to pressure of the wind against the shield 16, there is a radial thrust bearing at 36. The shield 16 is substantially of the form shown in my co-pending applications referred to, with the exception that to coact with the particular form of blades herein shown the edge at the inlet side of the shield is preferably not turned outwardly.

It is found by experiment with the form of rotor herein described that a partial vacuum results behind the shield 16 and a reduced pressure of a less extent in the space behind the portion of the rotor in front of which the shield 16 stands. This phenomenon has made a modification of the deflector element 17 from the form shown in the former applications desirable. As shown herein, the deflector 17 is preferably made substantially straight with its rear edge 37 turned at an angle to the straight portion thereof.

The deflector is preferably made also somewhat less in extent that the forms heretofore shown. In addition to the deflector 17, there are shown vanes 38, 39, which may be mounted upon rods 40, 41 extending from the lower spider 13 to the roof element 18. Without these latter referred to vanes the vane 22 is required to be of excessive size with the form of rotor herein described.

As shown, the rotor is comprised of blades 42, which are formed of some flexible material, as canvas, or preferably of flexible sheet metal. The blades may be supported by having one edge turned about vertical rods 43, mounted in the ends of the spider arms 28, and the other edge turned about rods 44 mounted in rings 45, 46 top and bottom. A ring is indicated also at 47 upon the intermediate spider arm, and such a ring will be provided with each intermediate set of spider arms where more than one such set is provided. The rings are shown as secured to the spider arms, as by means of bolts 48, and a plurality of holes 49 are shown. By shifting the bolts 48 from one of such holes to another the rings may be rotated to vary the amount of slack in the blades 42. As shown in Fig. 2, the ends of the spider arms 27 are connected by a rod or cable 50. The use of this part is optional and would depend to some extent upon the size of the structure and upon the velocity of the prevailing winds.

The action of the governing apparatus is to control the vane 22, as well as the lubricating system in the manner described in the co-pending applications referred to.

In the operation of the device the curvature taken by the flexible blades 42 will vary with the change of their angle to the direction of the wind during rotation of the rotor. When the wind first impinges against them the portion of shortest radius will be adjacent the rods 44. This formation will gradually vary until the position where the wind strikes the blades perpendicular to a line drawn between their supporting rods since the curvature taken will be substantially that of a section of the cylinder. Toward the latter portion of the action of the wind upon the blades, the portion with the curvature of shortest radius will move toward the outer edge of the blade. The action of the blades is therefore analogous to that of a well designed sail upon a boat and the variation to the most useful curvature is automatic with revolution of the rotor. Moreover the partial vacuum provided behind the shield 16 will result in the portion of the revolution of the rotor which is not supplying power, being made under the most advantageous conditions.

Minor changes may be made in the physical embodiment of the invention without departing from its spirit.

I claim:

1. A windmill comprising a vertical shaft, a rotor carried thereby comprising flexible blades mounted to vary their curvature, with the angle presented to the wind during rotation, said rotor having a clear annular passage about the axis within the inner edges of said blades, and a shield to prevent action of the wind upon blades moving counter to its direction.

2. A windmill comprising a vertical shaft, a rotor carried thereby comprising flexible blades adapted to vary their curvature with the angle presented to the wind during rotation, means to vary the amount of slack in said blades, and a shield to prevent action of the wind upon blades moving counter to its direction.

3. A windmill comprising, in combination, a vertical shaft, a rotor carried thereby, flexible blades mounted upon said rotor so as to provide slack between the edges thereof and mounted to vary their curvature during rotation of the rotor as the angle of incidence of the wind thereagainst varies, said rotor having a clear annular passage about the axis within the inner edges of said blades, a shield to prevent action of the wind upon blades moving counter to its direction, and means to govern the position of the shield with relation to the direction of the wind.

4. A windmill comprising, in combination, a vertical shaft, a rotor carried thereby, flexible blades mounted upon said rotor so as to provide slack between the edges thereof and mounted to vary their curvature during rotation of the rotor as the angle of incidence of the wind thereagainst varies, said rotor having a clear annular passage about the axis within the inner edges of said blades, a shield to prevent action of the wind upon blades moving counter to its direction, means to govern the position of the shield with relation to the direction of the wind and a deflector to confine the current of air passing with the blades of the rotor.

5. A windmill comprising, in combination, a vertical shaft, a rotor carried thereby, flexible blades mounted upon said rotor so as to be slack between the supported edges, and adapted to vary their curvature with variation of the angle of incidence of the wind thereagainst during rotation, a shield to prevent action of the wind on one side of the rotor during operation thereof, means to support said shield revoluble about said vertical shaft for movement independent of the rotor, a deflector carried by said means in fixed spaced relation to the shield, the rear edge of said deflector extending at an angle to the plane thereof.

6. A windmill comprising, in combination, a vertical shaft, a rotor carried thereby, flexible blades mounted upon said rotor so as to be slack between the supported edges, and adapted to vary their curvature with variation of the angle of incidence of the wind thereagainst during rotation, a shield to prevent action of the wind on one side of the rotor during operation thereof, means to support said shield revoluble about said vertical shaft for movement independent of the rotor, a deflector carried by said means in fixed spaced relation to the shield, the rear edge of said deflector extending at an angle to the plane thereof, vertical vanes also mounted upon said means to leeward of the rotor.

7. A windmill comprising a vertical shaft, a rotor carried thereby, flexible blades mounted upon said rotor, each extending from the periphery thereof a portion only of the distance to the center, whereby to provide an open space in the central portion of the rotor to allow wind to spill from the inner edge of each blade and to act upon one or more blades during its course through the rotor, said blades varying in curvature with variation of the angle of incidence of the wind.

8. A windmill comprising a vertical shaft, a rotor carried thereby, flexible blades mounted upon the rotor, each extending from the periphery thereof a portion only of the distance to the center thereof, whereby to provide an open space at the center of the rotor to cause wind passing through the rotor to act upon a plurality of blades in its passage, said blades varying in curvature with variation of the angle of incidence of the wind and a shield preventing action of the wind upon the blades moving counter to its direction.

9. A windmill comprising a vertical shaft, a rotor carried thereby comprising flexible blades, rigid vertical members secured to the vertical edges of said blades, the distance between said members being less than the horizontal extent of said blades, the inner blade-supporting members spaced from said vertical shaft whereby to provide a clear annular passage about the axis within the inner edges of said blades, and a shield mounted to prevent action of the wind upon blades moving counter to its direction.

10. A windmill comprising a vertical shaft, a rotor carried thereby comprising pairs of vertical members arranged substantially radially from said shaft, flexible blades having their vertical edges secured to said members, the horizontal extent of said blades being greater than the normal spacing between members of the pairs, means to vary the spacing between said members whereby to vary the slack in said blades, and a shield to prevent action of the wind upon blades moving counter to its direction.

11. A windmill comprising a vertical shaft, a rotor carried thereby comprising pairs of vertical members arranged substantially radially from said shaft, flexible blades having their vertical edges secured to said members, the horizontal extent of said blades being greater than the normal spacing between members of the pairs, means to vary the spacing between said members whereby to vary the slack in said blades, a shield to prevent action of the wind upon blades moving counter to its direction, and means to govern the position of the shield with relation to the direction of the wind to more or less shield also the blades moving in the direction of the wind.

JAMES T. RYAN.